United States Patent
Coleman et al.

(10) Patent No.: US 6,645,030 B2
(45) Date of Patent: Nov. 11, 2003

(54) SPINNER CANDY TOY

(76) Inventors: Thomas J. Coleman, 19170 Paddock Pl., Abingdon, VA (US) 24211; William K. Schlotter, IV, 117 Wateridge La., Fredericksburg, VA (US) 22406; Princess Ann Coleman, 19170 Paddock Pl., Abingdon, VA (US) 24211; Ann M. Schlotter, 117 Wateridge La., Fredericksburg, VA (US) 22406

( * ) Notice: Subject to any disclaimer, the term of this patent is extended or adjusted under 35 U.S.C. 154(b) by 27 days.

(21) Appl. No.: 09/771,233

(22) Filed: Jan. 29, 2001

(65) Prior Publication Data

US 2002/0102903 A1 Aug. 1, 2002

(51) Int. Cl.[7] .............................................. A63H 33/26
(52) U.S. Cl. ......................... 446/73; 446/236; 426/104
(58) Field of Search ............................ 40/586; 426/104, 426/132, 134; 446/71, 72, 73, 236, 484

(56) References Cited

U.S. PATENT DOCUMENTS

| | | | | |
|---|---|---|---|---|
| 2,874,496 A | * | 2/1959 | Rakes | |
| 5,209,692 A | * | 5/1993 | Coleman et al. | 446/71 |
| 6,074,266 A | * | 6/2000 | Zak | 446/236 X |
| 6,095,885 A | * | 8/2000 | Coleman et al. | 446/236 |
| 6,183,336 B1 | * | 2/2001 | Coleman et al. | 446/267 |

* cited by examiner

*Primary Examiner*—John A. Ricci
(74) *Attorney, Agent, or Firm*—Melvin L. Crane

(57) ABSTRACT

A candy toy holder device which provides fun and visual pleasure for the consumer as well as providing a candy treat. The device includes an upper housing and a main housing which provides a support for a lollipop via a rotatable support holder operative by a motor and gearing in the main housing. The upper housing has one or more movable parts that perform a variety of movements. It may be constructed so that the movements include appendages moving around, up, down, in or out and the candy is designed to rotate whether or not the motion parts are active or inactive. The movements are activated by the use of a motor on a gearing device, a switching device and a power source. The power source is self-contained within the main housing and the housing is designed in a manner that allows the battery to be replaceable as well as the candy. Use of one or more gears and/or gearing systems allows the movements of parts.

6 Claims, 4 Drawing Sheets

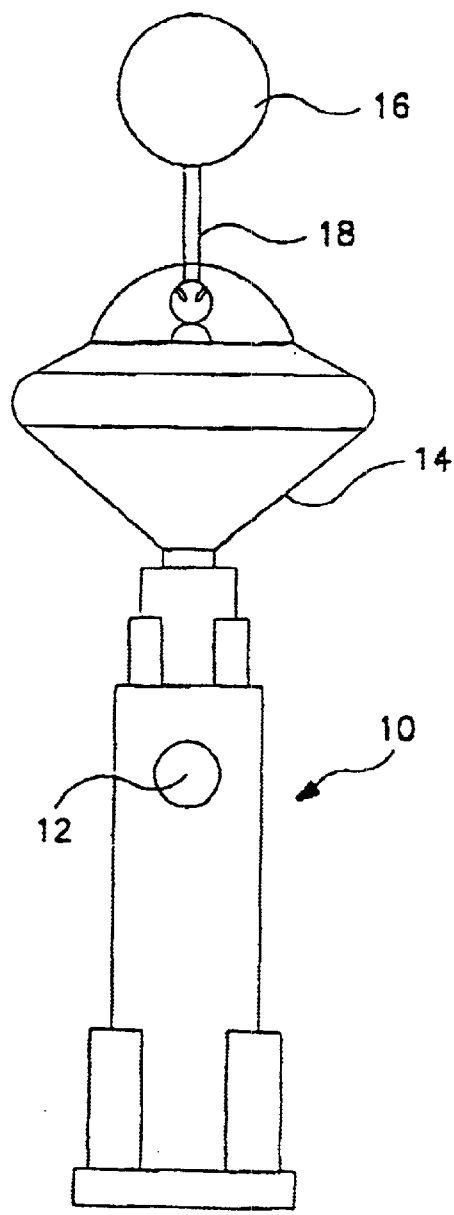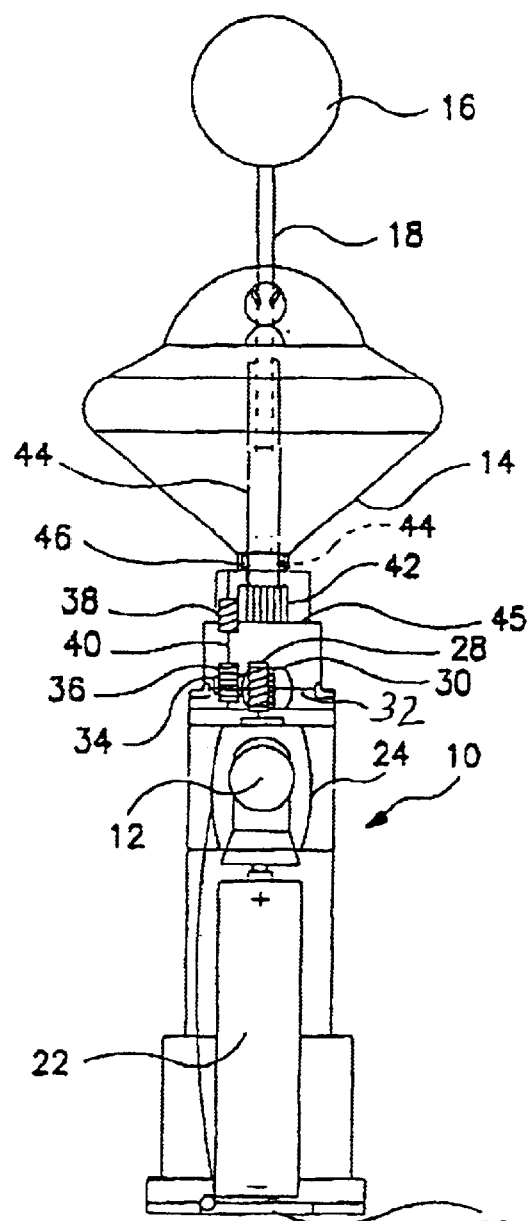

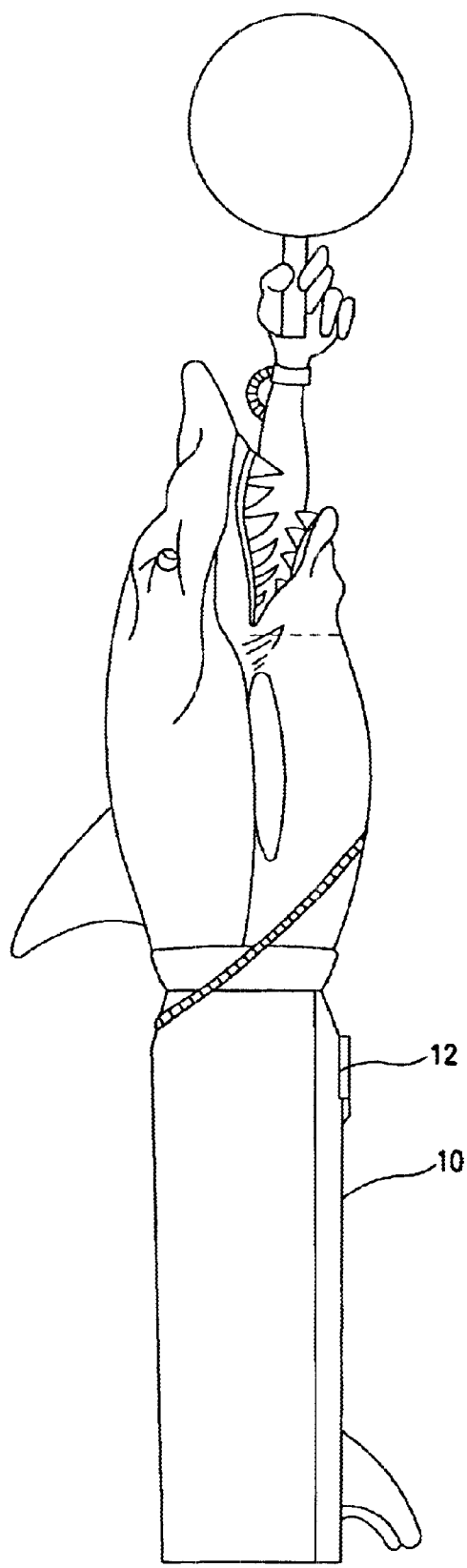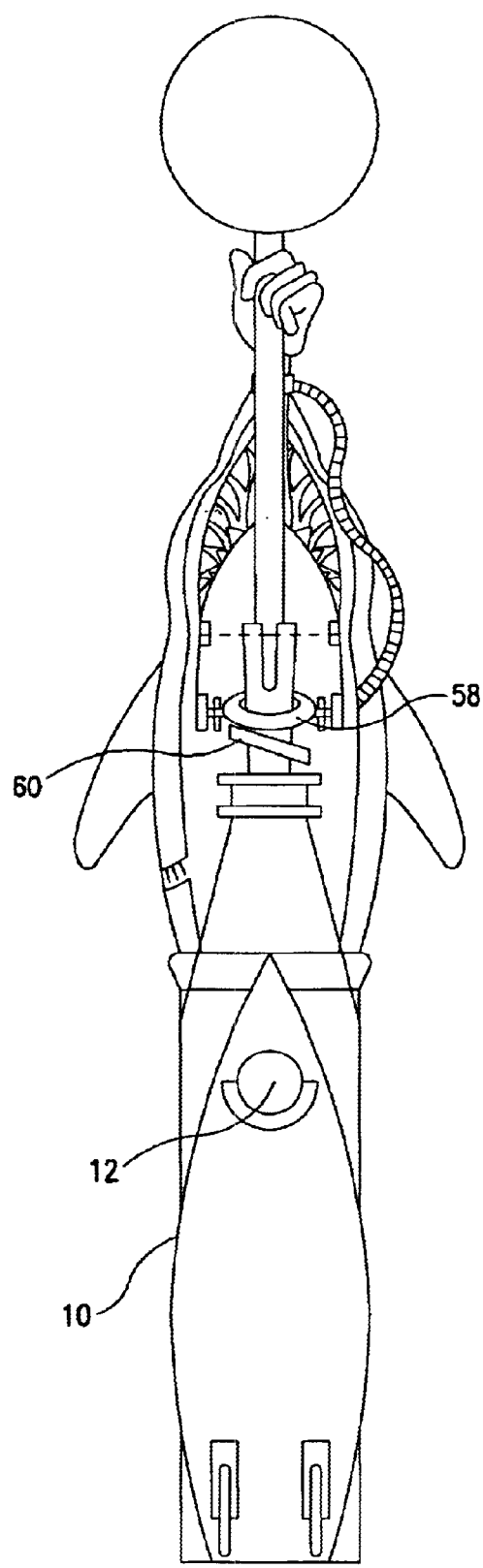

SPINNER CANDY TOY

CROSS-REFERENCE TO RELATED PATENT

This invention is an improvement over U.S. Pat. No. 5,209,692.

BACKGROUND OF THE INVENTION

This invention is directed to a candy toy and more particularly to a candy toy having a movable and/or non-movable upper housing part which is secured relative to a rotatable or non-rotatable candy pop supported by the housing or in a rotatable or nonrotatable candy pop support holder.

Heretofore, the inventors have obtained patents on different devices useful with a candy pop for consumption of the candy pop and for other pleasures.

OBJECTS AND ADVANTAGES

It is therefore an object of the present invention to provide a molded candy pop for consumption by a user and/or to create pleasurable movable and/or nonmovable parts which can be operated during rotation or nonrotation of the candy pop by the user for their amusement and pleasure.

Yet another object is to provide a candy pop in which the candy pop can be replaced by another pop when the one secured to the candy pop holder has been consumed.

Still another object of the invention is to provide a candy pop device in which a housing part is movable relative to a candy support stick supported by a rotatable candy support pop holder.

Still another object is to provide a removable and replaceable upper housing, each of which have different shapes and/or movements such as stationary, rotatable, movable, up and down, in or out, i.e., a car spinning around on a track, a fox chasing a chicken, a girl chasing a boy, a fan, one's arm raising up and down, as well as any other movements. Also the housing may have different drawings, characters, figures, etc. on the housing.

Other objects and advantages of the invention will become obvious to those skilled in the art upon reading the specification and viewing the drawings.

BRIEF DESCRIPTION OF THE DRAWINGS

FIG. 1 illustrates a side view illustrating an overall view of the device;

FIG. 2 illustrates a cut-away view showing the relative parts of one modification of the device;

FIG. 5 illustrates a side view of a modification;

FIG. 6 illustrates a front view of the modification shown in FIG. 5; and

DETAILED DESCRIPTION

Figure 3A:
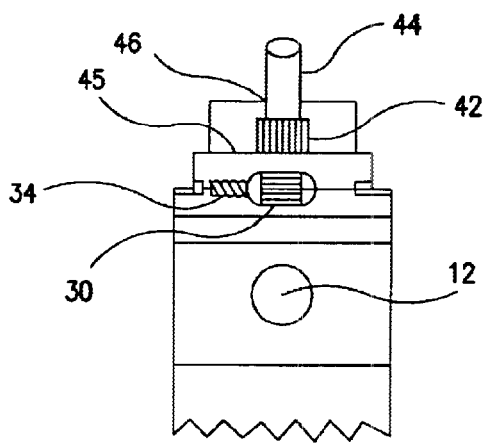
FIGS. 3a and 3b illustrate different views of the gearing system for rotating the upper housing.

Now referring to the drawings, the different views illustrate an operative spinner candy toy wherein the same reference characters are used for the same operative parts throughout the drawings.

FIG. 1 is a side view of a spinner device including a main housing 10 which can be clear plastic, a contact button control switch 12, an upper housing 14 which can be rotatable and/or have appendages which are movable relative to the upper body, a lollipop 16 on a support 18 which is secured in a rotatable candy support holder 44 which is secured to the candy support holder. FIG. 2 illustrates a clear plastic device illustrating a hinged cover 20 at the bottom which can be opened to insert or replace one or more batteries 22. The battery operates a motor 24 which is controlled by the switch 12. The switch can be an on-off type or one that functions only while pressed, in order to operate the motor. The motor drives a first gear 28 which is rotatable around a vertical axis. The first gear drives a first horizontal gear 30 via shaft 32, which in turn drives a second horizontal gear 34. The second horizontal gear drives a second vertical gear 36 which drives a third vertical gear 38 via a second shaft 40. The third vertical gear drives a fourth vertical upper housing drive gear 42 which is shown larger than the other gears in order to drive the candy support holder and the upper housing at a slow rate. The fourth vertical gear rotates the gear 42 which rotates the candy support holder 44 to which the upper housing is secured for rotation with the candy support holder. The upper housing is secured to the candy support holder at 46 for rotation with the candy support holder.

Figure 3B:
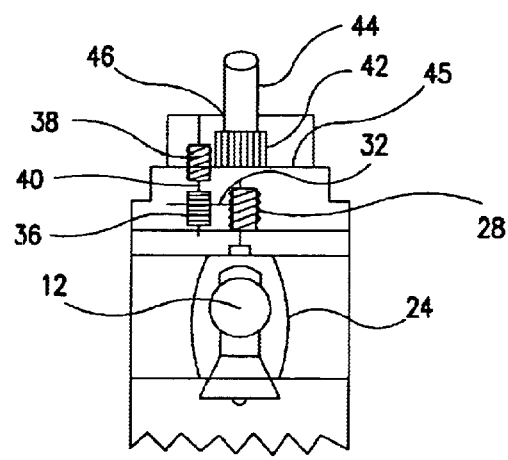

The upper housing can be of any shape and can be decorated with any amusing decorative scheme. Different upper housings can be provided so that one housing can be removed and a different decorative housing can replace the removed housing. FIGS. 3a and 3b illustrate the horizontal and vertical drive gears which rotate the candy support holder.

Figures 4, 9:
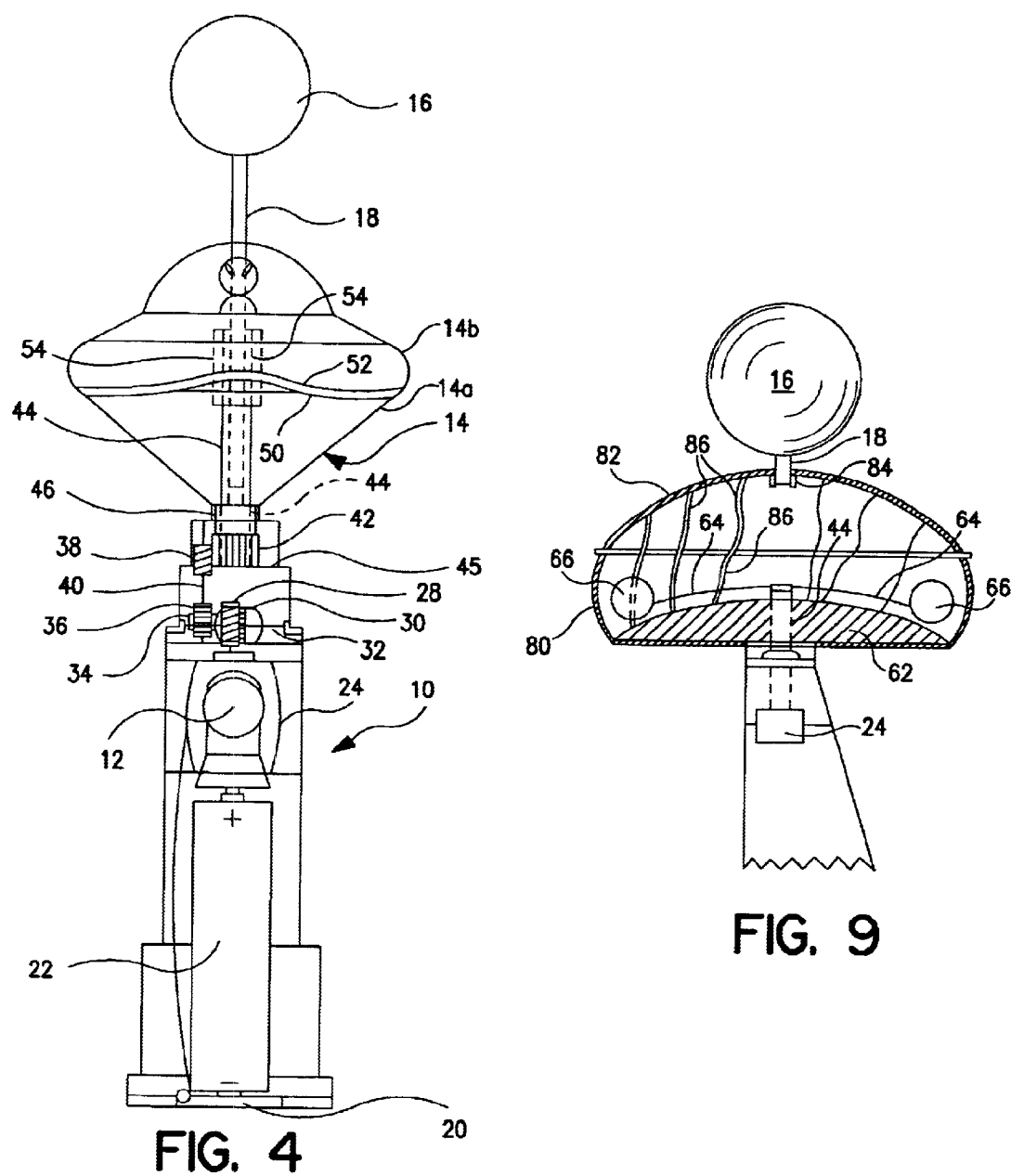
FIG. 4 illustrates a cut-away side view of a modification.

FIG. 4 illustrates a modification in which the housing 14 is formed in two halves 14a and 14b. The two halves of the housing are formed with adjacent cam surfaces 50 and 52. The lower portion 14a is fixed to the bottom housing 10 so that the lower half 14a of the housing does not rotate. The upper half 14b is loosely splined to the candy support holder by keys 54 and is rotatable with the candy support holder. As the candy support holder rotates, the upper half 14b of housing 14 rotates with the candy support holder and due to the related cam surfaces the upper half of the housing will move up and down on the keys 54. The upper housing portion 14b could be secured to the bottom portion 14a by springs or rubber bands which ensures that the upper half 14b will follow the cam surface of the lower portion 14a. Thus, the candy pop holder and the upper housing portion 14b will rotate as the motor is operated.

FIGS. 5 and 6 illustrate a side view of a modification which illustrates a shark 56 holding a candy support 18 secured in a candy support holder with the mouth portion containing the candy support holder. The shark head forms a portion of the housing and the lower jaw of the shark is movable from a closed to an open portion by a cam operated holder 58 which follows a cam 60 on the candy support holder. As the candy support rotates with the candy support holder, the spring-loaded holder 58 moves up and down along the cam so that the mouth opens and closes.

Figure 7:
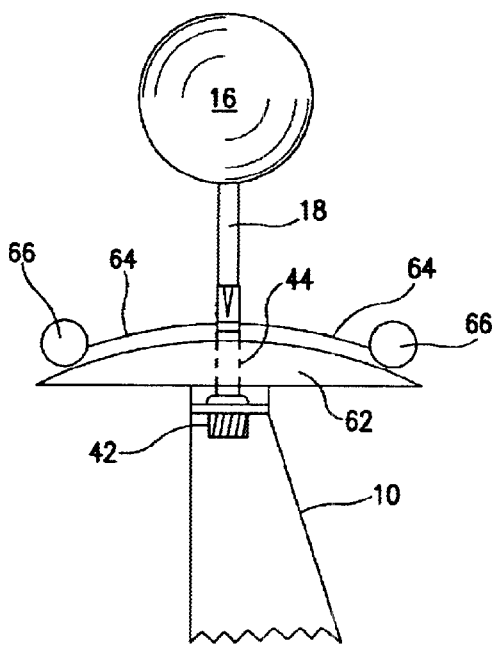
FIGS. 7–9 illustrate different modifications.
Figure 8:
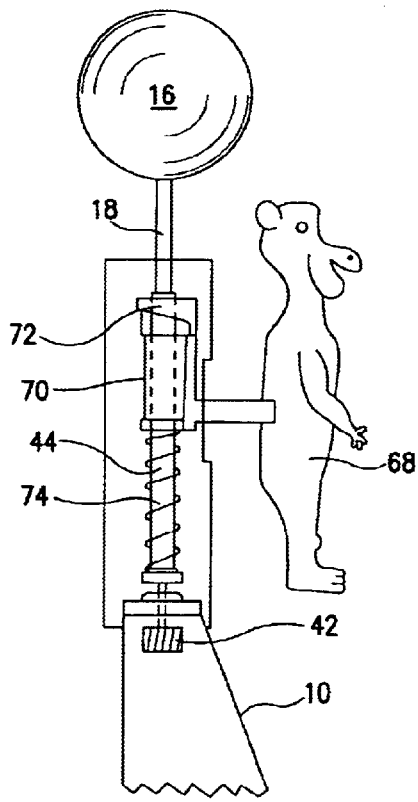

FIGS. 7 and 8 illustrate different modifications. FIG. 7 illustrates a drive such as shown in FIGS. 2, 3a and 3b with a housing portion 62 fixed to the lower housing 10. The candy support holder 44 rotates by operation of the motor. The arms 64 are secured to the candy stick holder and rotate with the candy stick holder relative to the fixed housing 62. The circular ends 66 on the arms represent any type or shape of structure one desires to be rotated with the arms 64. The rotatable device could be a fan or any other structure.

FIG. 8 illustrates some type of FIG. 68 extending from a fixed housing. The figure is secured to a movable sleeve 70 which follows a cam 72 on the candy support holder. The movable sleeve operates along the cam which operates relative to a spring 74. The spring applies a force on the movable sleeve so that the movable sleeve follows the cam on the rotating candy support holder as the candy support holder rotates. As the candy support holder rotates, the cam moves the movable housing along the candy support holder for an up-and-down movement of the figure.

In operation, the switch 12 is closed to operate the motor. The motor then drives the gears which in turn drive the candy support holder 18. Since the sucker support is secured in a rotatable sucker support holder, as the sucker rotates the housing does not rotate with the sucker support.

It would be obvious to one skilled in the art that the sucker could be secured to the upper housing so that the sucker would rotate with the upper housing. However, as shown, the sucker is fixed in the rotatable holder 44 and is rotatable.

Since the upper housing rotates, decorative parts could be added so that the decorative parts would move with the rotatable housing to present a pleasant view. The decorative parts could be made to move around, up and down, in or out, or any motion relative to the upper housing.

FIG. 9 illustrates a two-part housing 80 and 82 which are secured together by any suitable means such as screws. In this modification the housing 80, 82 and candy pop are not rotatable. The candy stick holder 84 is fixed to the non-rotatable housing. This modification includes a rotatable device 64 which can take a shape of any desired linear structure such as a fan blade, an arm with a structure 66 thereon, or any other rotatable device which fits within the housing. Instead of the bottom of the housing being curved as shown, the housing could be flat such as in a regular fan. The housing sections are shown with openings between supporting ribs 86.

Since only the rotatable device rotates, the rotatable device can be rotated by a shaft which extends directly from the motor as shown in FIG. 9. However, it is preferred that the rotatable device be driven by a gearing arrangement such as shown in other drawings so that the rotating device can be driven at a slower rotation from that of the motor 24.

The foregoing relates to preferred exemplary embodiments of the invention, it being understood that other variants and embodiments thereof are possible within the spirit and scope of the invention, the latter being defined by the appended claims.

We claim:

1. A spinner candy toy device which comprises a main housing, an upper housing, a rotatable candy support holder for holding a candy pop support for rotation, means for rotating said candy support holder, and at least a portion of said upper housing is secured to said candy support holder for rotation with said candy support holder.

2. The spinner candy toy device as set forth in claim 1, in which said upper housing is formed as one piece and the entire housing rotates with said candy support holder.

3. The spinner candy toy device as set forth in claim 1, in which said upper housing is made in first and second sections, the first section of said housing is secured to an upper end of said main housing, and said second section is secured to said candy support holder for rotation with said candy support holder.

4. The spinner candy toy device as set forth in claim 3, in which adjoining surfaces of said first and second sections of said upper housing form curved cam surfaces so that the second section moves up and down on said candy support holder as said second section moves with the candy support holder.

5. The spinner candy toy device as set forth in claim 4, in which said second section has at least one axial groove, and said candy support holder includes at least one axial key which extends radially into said at least one groove in said second section.

6. The spinner candy toy device as set forth in claim 5, in which said second section of said housing has oppositely disposed axial grooves and said candy support holder has oppositely disposed axial keys that extend radially into said oppositely disposed axial grooves in the second section of the upper housing.

\* \* \* \* \*